United States Patent
Nameda (10) Patent No.: US 8,376,572 B2
(45) Date of Patent: Feb. 19, 2013

(54) BACKLIGHT DEVICE FOR LIQUID CRYSTAL MODULE

(75) Inventor: Makoto Nameda, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 208 days.

(21) Appl. No.: 12/878,472

(22) Filed: Sep. 9, 2010

(65) Prior Publication Data

US 2011/0122612 A1 May 26, 2011

(30) Foreign Application Priority Data

Sep. 10, 2009 (JP) ................................ 2009-209134

(51) Int. Cl.
*F21V 21/00* (2006.01)
(52) U.S. Cl. ................. 362/217.15; 362/97.1; 362/97.2; 362/97.4
(58) Field of Classification Search ............. 362/217.15, 362/97.1–97.4
See application file for complete search history.

(56) References Cited

U.S. PATENT DOCUMENTS 7,325,937 B2 * 2/2008 Aoki et al. .................. 362/97.1
8,021,015 B2 * 9/2011 Yokota et al. ................. 362/220
2009/0207587 A1 * 8/2009 Azuma et al. ................. 362/97.1
2010/0002417 A1 * 1/2010 Chiu et al. .................... 362/97.1

FOREIGN PATENT DOCUMENTS

| JP | 2006-286341 A | 10/2006 |
| JP | 2008-65131 A | 3/2008 |
| JP | 2008-218090 A | 9/2008 |

* cited by examiner

*Primary Examiner* — Evan Dzierzynski
(74) *Attorney, Agent, or Firm* — Global IP Counselors (57) ABSTRACT

A backlight device includes a frame, a linear light source, and a lamp holder. The lamp holder supports the linear light source. The lamp holder includes an arc-shaped arm component, a concave protrusion, and a pair of convex protrusions. The arm component has a middle portion and a pair of end portions. The end portions extend from the middle portion, respectively. The concave protrusion extends from the middle portion in a radial inward direction of the arm component. The concave protrusion has a concave face that contacts an outer peripheral face of the linear light source. The convex protrusions extend from the end portions in the radial inward direction of the arm component, respectively. Each of the convex protrusions has a convex face that contacts the outer peripheral face of the linear light source such that the convex protrusions press the linear light source against the concave protrusion.

20 Claims, 4 Drawing Sheets

BACKLIGHT DEVICE FOR LIQUID CRYSTAL MODULE

CROSS-REFERENCE TO RELATED APPLICATIONS

This application claims priority to Japanese Patent Application No. 2009-209134 filed on Sep. 10, 2009. The entire disclosure of Japanese Patent Application No. 2009-209134 is hereby incorporated herein by reference.

BACKGROUND

1. Field of the Invention

The present invention generally relates to a backlight device for a liquid crystal module. More specifically, the present invention relates to a backlight device for a liquid crystal module having a lamp holder that supports a linear light source.

2. Background Information

Conventional lamp holders of a backlight device for a liquid crystal module are well known. The lamp holders hold linear light sources with an arc-shaped arm component of the lamp holders.

With a conventional lamp clip (e.g., lamp holder), an opening that is utilized during mounting of a linear light source is provided to a C-shaped holder that functions as an arm component. The C-shaped holder has a protrusion with a pointed shape (see Japanese Laid-Open Patent Application Publication No. 2006-286341, for example).

With another conventional lamp clip, in addition to the above-mentioned configuration, the C-shaped holder further has clamping components for clamping the linear light source in the C-shaped holder. Furthermore, end portions of the C-shaped holder are extended outward to guide the insertion of the linear light source (see Japanese Laid-Open Patent Application Publication No. 2006-286341, for example).

With further another conventional lamp clip, in addition to the above-mentioned configuration, the C-shaped holder further has a plurality of protrusions at three places of the C-shaped holder, so that the linear light source is clamped between the protrusions (see Japanese Laid-Open Patent Application Publication No. 2006-286341, for example).

These conventional lamp clips also have base components, respectively. The C-shaped holders are connected to the base components at peripheral center portions of the C-shaped holders, respectively.

Furthermore, with another conventional lamp holder, an arc-shaped support portion clamps a slender fluorescent tube (see Japanese Laid-Open Patent Application Publication No. 2008-218090, for example). With yet another conventional lamp holder, slender fluorescent tubes are disposed in parallel and adjacent to each other. A pressing force is imparted to the slender fluorescent tubes by the conventional lamp holder (see Laid-Open Patent Application Publication No. 2008-65131, for example).

Moreover, further another conventional lamp holder is used for a linear light source having a very slender fluorescent tube with an outside diameter of about 3 mm. The lamp holder is fixed to a sheet-like member of a liquid crystal module, such as a light reflecting member.

This lamp holder has a wide, sheet-like leg component, a pair of clamping pieces with a concave component therebetween, and a base component. The concave component has a true circular shape. The concave component has an inside diameter that is the same as the outside diameter of the linear light source. The concave component is connected to the base component that is fixed to a light reflecting member. Elasticity is imparted to the clamping pieces. The clamping pieces are opposite each other and thereby form the concave component therebetween. Distal end faces of the clamping pieces are formed as guide faces that are inclined to spread outward. The space between the guide faces serves as an opening for inserting the linear light source. With this lamp holder, the linear light source is embraced by the pair of clamping pieces. In order to keep a region where light is blocked by the clamping pieces as small as possible and prevent a decrease in image quality with a liquid crystal cell, a hard, plate-like molded resin that is extremely thin (with a thickness of about 1 to 1.5 mm) yet is not floppy is employed for the material of this lamp holder.

When supporting the linear light source in this lamp holder, the linear light source is pushed through the opening, and inserted into the concave component while using the guide faces to bend the clamping pieces outward. In this step, the linear light source hits the inner peripheral face of the concave component relatively hard immediately after going past the clamping pieces as the clamping pieces are bent to the outside. However, with this lamp holder, the linear light source hits the inner peripheral face of the concave component in a state of either planar contact or linear contact, and the impact load is dispersed. Thus, even though this lamp holder is formed from a hard, plate-like molded resin that is extremely thin yet is not floppy, breakage of or damage to the linear light source because of impact during collision is unlikely to occur.

SUMMARY

Meanwhile, this lamp holder is produced so that the shape of the inner peripheral face of the concave component is in a true circular shape to match the outer peripheral shape of the true circular linear light source. However, it has been discovered that, in a state in which the inner peripheral face of the concave component is superposed with the outer peripheral face of the linear light source, a situation can arise in which the true circular shape of either component becomes distorted. If this should happen, a tiny space is formed between the outer peripheral face of the linear light source and the inner peripheral face of the concave component. This space becomes a source of looseness that can result in what is called humming or other such noises, which leads to a decrease in the quality of the liquid crystal module or of an audio-visual device such as a television set in which the liquid crystal module is used.

On the other hand, with the above-mentioned conventional lamp clips having the pointed protrusion, it is possible to support the linear light source with the C-shaped holder by bringing the linear light source into contact with three places, namely, at the pointed protrusion in the center of the C-shaped holder, and at end portions on both sides of the C-shaped holder. However, it has been discovered that, if this configuration is applied so that a pointed protrusion is formed in the peripheral direction center of the concave component of the above-mentioned conventional lamp holder, then in the step in which the linear light source is supported by the above-mentioned conventional lamp holder, there will be a greater risk of breakage or damage to the slender linear light source during collision. Specifically, there will be a greater risk of breakage or damage to the slender linear light source when the linear light source hits the protrusion, which is pointed and made of a hard resin, relatively hard immediately after going past the clamping pieces as they are bent to the outside.

In contrast, it has also been discovered that, if, as with the above-mentioned lamp clip having three protrusions, one of the protrusions is formed in a peripheral direction center of the C-shaped holder so that their top contour line is in an arc shape then even if the linear light source hits the protrusion relatively hard in the step in which the linear light source is supported in the above-mentioned conventional lamp clip, the impact load during collision will be dispersed by the top of the protrusion, which comes into planar or linear contact with the linear light source. Thus, there will be less risk of breakage or damage. However, with the above-mentioned conventional lamp clip, the protrusions contact the linear light source at three places staggered 90 degrees around the linear light source. Therefore, if this configuration is applied directly to the concave component of the above-mentioned conventional lamp holder, the above-mentioned distortion will occur in the clamping pieces of the above-mentioned conventional lamp holder or the linear light source, and a space will develop between the linear light source and the three protrusions, which creates the risk that humming or other noise will be generated. This same problem can also occur when the clamping components of the above-mentioned conventional lamp clip are applied to the above-mentioned conventional lamp holder.

Furthermore, it has been discovered that, bringing the clamping pieces of the lamp holder into contact at three places and in a state of point contact on the outer peripheral face of the linear light source is advantageous in terms of suppressing humming noise generated at the places where the linear light source is supported by the lamp holder. Moreover, it has been discovered that, depending on the shape of contact portions on the lamp holder, breakage or damage to the linear light source by impact load when the linear light source hits the contact portions on the lamp holder relatively hard can be prevented in the step in which the linear light source is supported in the lamp holder.

An improved backlight device for a liquid crystal module was conceived in light of the above-mentioned problem. One object of the present disclosure is to provide a backlight device for a liquid crystal module with which generation of humming noise at a contact portion between a linear light source and a lamp holder is prevented, and breakage or damage to the linear light source while attaching the linear light source to the lamp holder is prevented.

In accordance with one aspect of the present disclosure, a backlight device for a liquid crystal module includes a frame, a linear light source, and a lamp holder. The linear light source is configured to emit light. The lamp holder supports the linear light source relative to the frame. The lamp holder includes an arc-shaped arm component, a concave protrusion, and a pair of convex protrusions. The arm component has a middle portion and a pair of end portions with an opening therebetween. The end portions extend from the middle portion, respectively. The concave protrusion extends from the middle portion of the arm component in a radial inward direction of the aim component. The concave protrusion has a concave face that contacts an outer peripheral face of the linear light source. The convex protrusions extend from the end portions of the aim component in the radial inward direction of the arm component, respectively. Each of the convex protrusions has a convex face that contacts the outer peripheral face of the linear light source such that the convex protrusions press the linear light source against the concave protrusion.

With this backlight device, it is possible to provide a backlight module with which generation of humming noise at a contact portion between a linear light source and a lamp holder is prevented, and breakage or damage to the linear light source while attaching the linear light source to the lamp holder is prevented.

BRIEF DESCRIPTION OF THE DRAWINGS

Referring now to the attached drawings which form a part of this original disclosure.

DETAILED DESCRIPTION OF EMBODIMENTS

A preferred embodiment will now be explained with reference to the drawings. It will be apparent to those skilled in the art from these disclosures that the following descriptions of the preferred embodiment are provided for illustration only and not for the purpose of limiting the invention as defined by the appended claims and their equivalents.

A backlight device 10 for a liquid crystal module will now be described through reference to FIGS. 1 to 5. The backlight device 10 for the liquid crystal module is employed in a typical liquid crystal television set. The liquid crystal module includes a liquid crystal cell (not shown) and the backlight device 10 that is disposed behind the liquid crystal cell.

Figure 4:
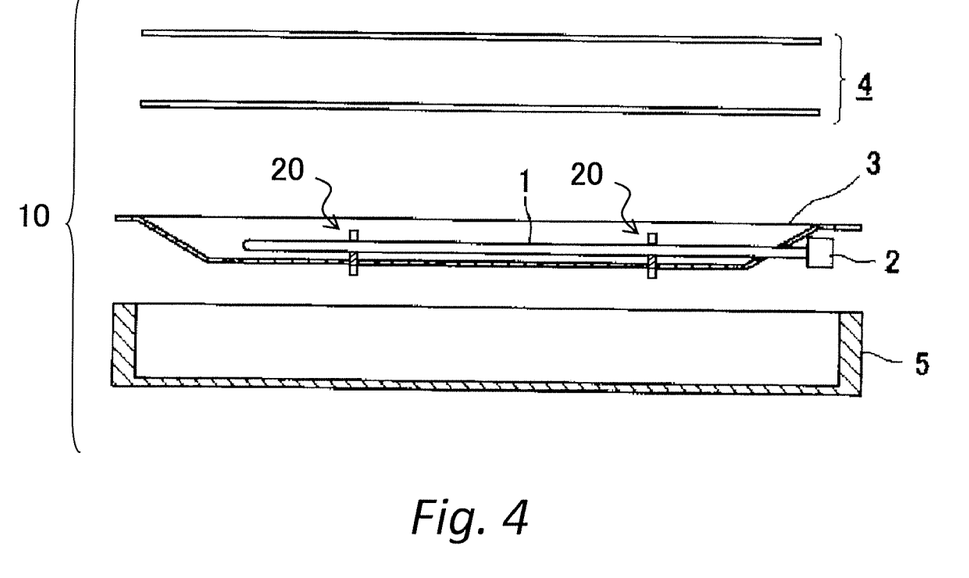
FIG. 4 is an exploded cross sectional view of the backlight device for a liquid crystal module in accordance with the embodiment.

As illustrated in FIG. 4, the backlight device 10 includes a plurality of (three, for example) linear light sources 1, a plurality of (three, for example) power supply sockets 2, a light reflecting member 3, a plurality of optical sheets 4, a frame 5 and a plurality of (six, for example) lamp holders 20. Each of the linear light sources 1 has a fluorescent tube in the shape of a straight or U-shaped tube. The contour of the fluorescent tube is formed by a slender, round tube. Each of the linear light sources 1 has electrodes at its end portions. The electrodes are fitted into the power supply socket 2. The light reflecting member 3 has a light reflecting face. The light reflecting member 3 is disposed behind the linear light sources 1. Various types of the optical sheets 4 (such as a light diffusing sheet) are disposed between the light reflecting member 3 and the liquid crystal cell (not shown). The liquid crystal cell are disposed forward of the backlight device 10 with respect to the optical sheets 4. Light from the linear light sources 1 reflects on the reflecting face of the light reflecting member 3, and then passes through the optical sheets 4 and shines on the liquid crystal cell (not shown) from behind. With this configuration, factors that affect image quality, such as the brightness balance of an image display face of the liquid crystal cell are controlled. The frame 5 is made of molded plastic, sheet metal, or the like. The frame 5 supports the linear light source 1, as well as the light reflecting member 3 and the optical sheets 4.

The lamp holders 20 are fixed to a sheet-like member of the liquid crystal module, such as the light reflecting member 3. The lamp holders 20 hold the linear light sources 1 relative to the frame 5, and position the linear light sources 1 at the proper positions behind the liquid crystal cell. The lamp holders 20 are preferably identical and preferably attached to the light reflecting member 3 in an identical manner. Thus, only one of the lamp holders 20 will be explained and/or illustrated in detail herein.

Figure 1:
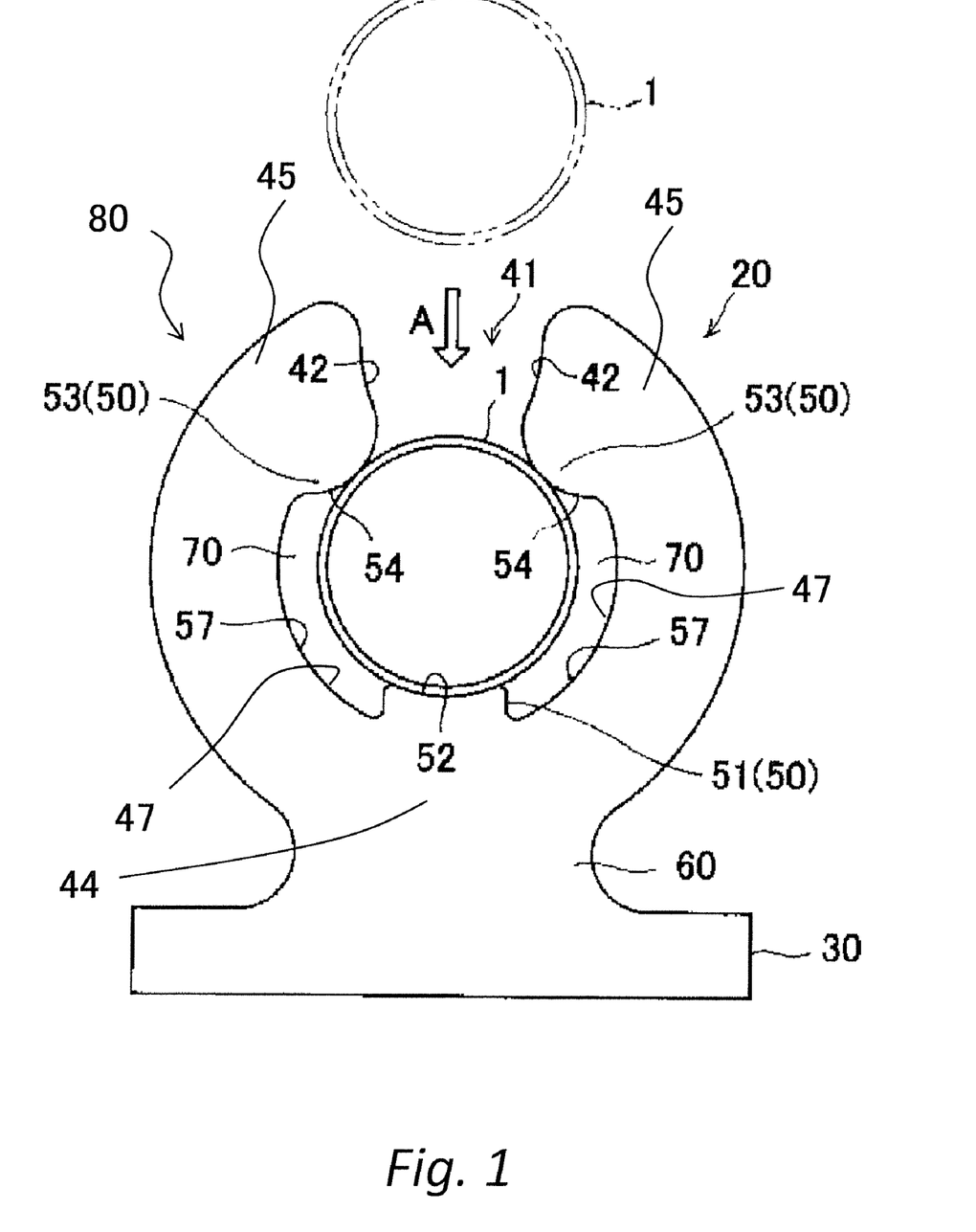
FIG. 1 is a detailed side view of a lamp holder of a backlight device in accordance with one embodiment.
Figure 5:
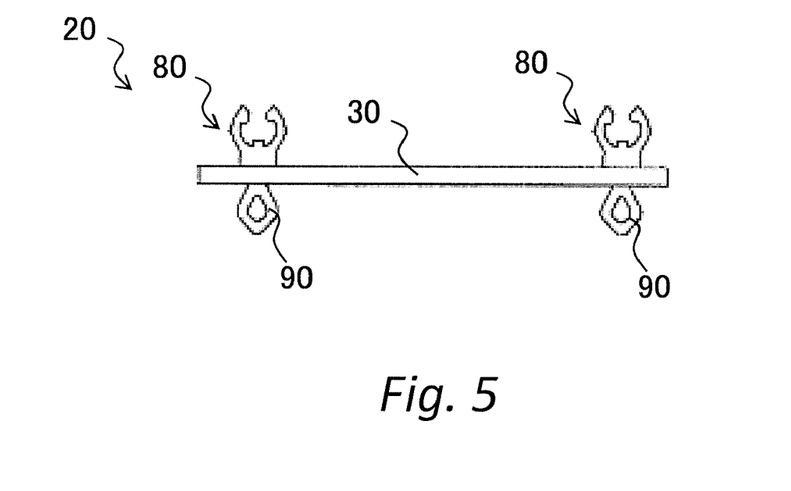
FIG. 5 is a side view of the lamp holder illustrated in FIG. 4.

As illustrated in FIG. 5, the lamp holder 20 has a base component 30, a pair of holding components 80 and a pair of hollow protrusions 90. The holding components 80 are disposed on a front side of the base component 30. The hollow protrusions 90 are disposed on a rear side of the base component 30. The lamp holder 20 is integrally formed as a one-piece, unitary member. The holding components 80 are identical. Thus, only one of the holding components 80 will be explained and/or illustrated in detail herein. As illustrated in FIG. 1, the holding component 80 includes an arm component 40, a plurality of contact components 50, a neck component 60. The arm component 40 is resilient and extends from the base component 30. The arm component 40 has a center portion (e.g., middle portion) 44 and a pair of end portions 45 that circumferentially extends from the center portion 44, respectively. The contact components 50 are provided to the arm component 40, and support the linear light source 1 at a support position by contacting only at three places around an outer peripheral face of the linear light source 1. An opening 41 is provided to the arm component 40 between the end portions 45 of the arm component 40.

The base component 30 is fixedly coupled to a sheet-like member included in the liquid crystal module, such as the light reflecting member 3, for example, by fitting the hollow protrusions 90 into holes formed on the light reflecting member 3 or another suitable means. The arm component 40 is attached in an erect state relative to the light reflecting member 3 by fixing the base component 30 to the light reflecting member 3, which serves as the sheet-like member. The arm component 40 is formed in a bow or arc shape that has a cut-out which forms the opening 41 when viewed from an axial direction of the arm component 40 (or central axis of the linear light source). The arm component 40 is contiguous with the base component 30 via the neck component 60 formed in the center portion 44 in the peripheral direction of the arm component 40. The neck component 60 has a narrower width than the arm component 40.

The neck component 60 and the arm component 40 having the contact components 50 at three places are formed extremely thin, that is, in a thickness of about 1 to 1.5 mm. The neck component 60 and the arm component 40 are formed as a molded resin in the form of a hard plate that is not floppy. Since the arm component 40 is thus formed by an extremely thin plate, the region in which light is blocked by the arm component 40 is kept as small as possible. This prevents a decrease in the image quality of the liquid crystal cell. The lamp holder 20 is integrally formed as a one-piece, unitary member from a molded resin. In particular, the lamp holder 20 is made of polycarbonate.

Figure 2:
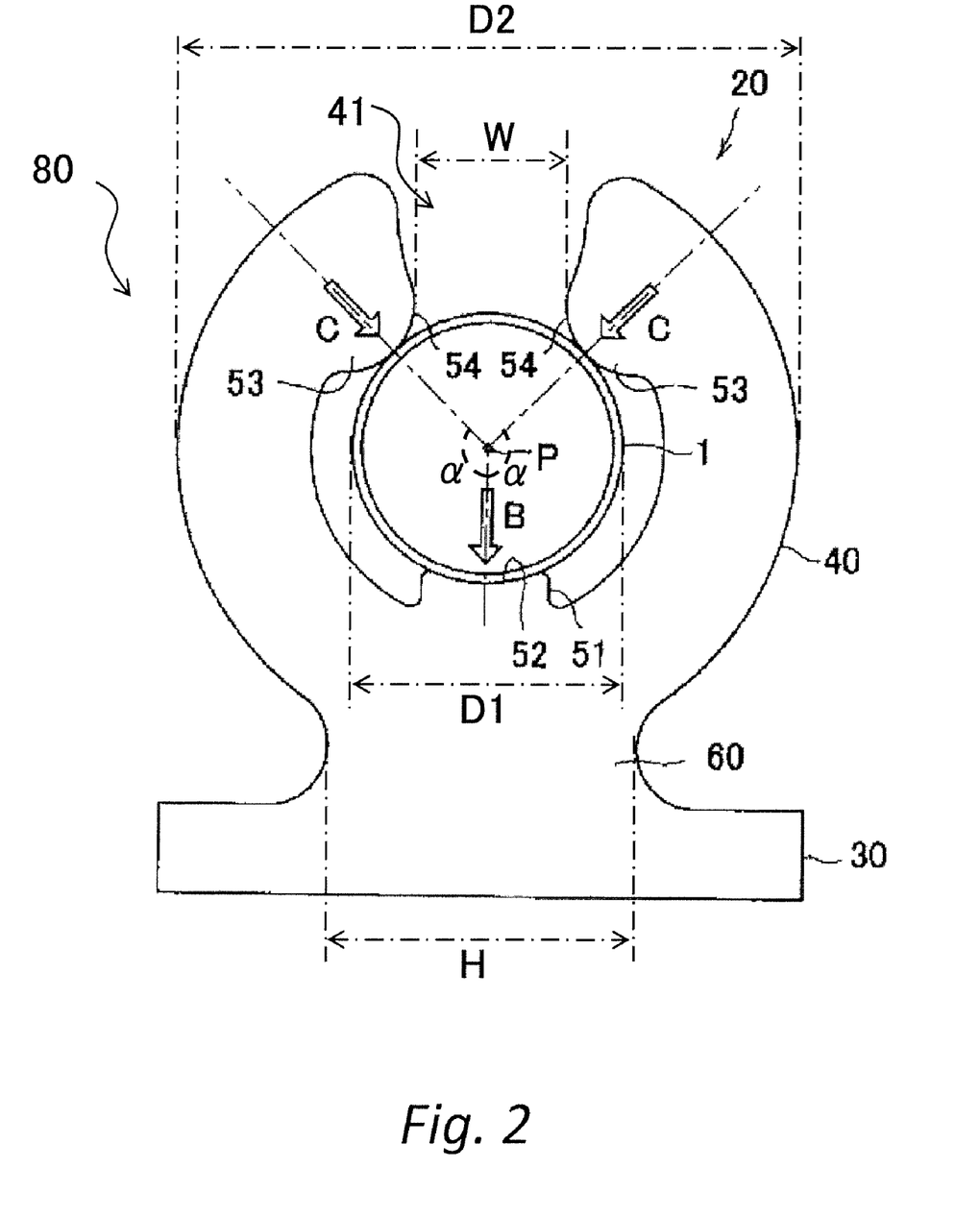
FIG. 2 is a detailed side view of the lamp holder illustrating a direction of a pressing force imparted to a linear light source of the backlight device.

Each of the linear light sources 1 has an extremely slender fluorescent tube whose contour has an outside diameter D1 of about 3 mm, as shown in FIG. 2. The opening 41 formed by the cut-out in the arm component 40 has an opening width W that is less than the outside diameter D1 of the linear light source 1, as shown in FIG. 2.

The contact components 50 provided at three places on the arm component 40 include a wide protrusion (e.g., concave protrusion) 51 and a pair of bumps (e.g., convex protrusion) 53. The protrusion 51 is provided at the center portion 44 (or bottom portion) of the arm component 40 in the peripheral direction of the arm component 40 and on the inner peripheral side thereof. The protrusion 51 extends in a radial inward direction of the arm component 40. The protrusion 51 has a top face (e.g., concave face) 52 that contacts the outer peripheral face of the linear light source 1. The bumps 53 are provided to the end portions 45 of the arm component 40, respectively, and are separated at the same separation angle (e.g., same predetermined angle) α and in mutually opposite directions (e.g., opposite circumferential directions of the arm component 40) from the place where the protrusion 51 is formed (i.e., center portion). The bumps 53 have top faces (e.g., convex faces) 54 that contact the outer peripheral face of the linear light source 1, respectively. Recesses 57 are formed between the protrusion 51 and the bumps 53, one on each side. The arm component 40 has inner peripheral faces 47 along the recesses 57. The inner peripheral faces 47 are radially spaced apart from the outer peripheral face of the linear light source 1. The separation angle α between the protrusion 51 and the bumps 53 (the separation angle α between a circumferential center point of the protrusion 51 and circumferential center points of the bumps 53) is an angle greater than 90 degrees. More specifically, the separation angle α is set at 135 degrees. Of the protrusion 51 and the bumps 53, the protrusion 51 serves to stop the linear light source 1 when the linear light source 1 is pushed in through the opening 41. A top contour line of the top face (e.g., concave face) 52 of the protrusion 51 has a radius of curvature that is the same as the radius of curvature of the outer peripheral face of the linear light source 1. On the other hand, the bumps 53 are formed so that top contour lines of the top faces (e.g., convex faces) 54 of the bumps 53 have an arc shape, respectively, when viewed from an axial direction of the arm component 40 (or central axis of the linear light source). Also, as shown in FIG. 1, the top contour lines of the top faces 54 of the bumps 53 are smoothly continuous with contour lines of two end faces 42 of the end portions 45 of the arm component 40. The space between the end faces 42 of the arm component 40, which defines the opening width W of the opening 41 therebetween, steadily increases outward in the radial direction of the arm component 40. With this configuration, the linear light source 1 that has been pushed in through the opening 41 goes past the bumps 53 and the two end portions 45 of the arm component 40 without trouble. As a result, the linear light source 1 can be pushed in with only moderate force, and this helps to reduce the impact load that accompanies the collision between the linear light source 1 and the protrusion 51.

As shown in FIG. 2, the width H of the neck component 60 is set to be shorter than the outside diameter (e.g., outer peripheral diameter) D2 of the arm component 40. Since the width H of the neck component 60 is set to be smaller than the outside diameter D2 of the arm component 40, the effective length of the arm component 40 can be extended correspondingly as compared to when the width H of the neck component 60 is the same as the outside diameter D2 of the arm component 40. Thus, even though the arm component 40 is a hard resin piece that is not floppy, suitable elastic strength in the diameter direction (e.g., radial inward and outward directions) can be imparted to the arm component 40. With this configuration, since the length of the arm component 40 is extended, the arm component 40 easily bends when the linear light source 1 is pushed in through the opening 41, and this helps to reduce the impact load that accompanies the collision between the linear light source 1 and the protrusion 51.

In the step of attaching the linear light source 1 into the lamp holder 20, the linear light source 1 is turned to face the opening 41, as indicated by an imaginary circle in FIG. 1, and pushed into the opening 41. The spacing between the two end faces 42 of the arm component 40 steadily increases outward in the radial direction of the arm component 40. Thus, the two end faces 42 of the arum component 40 act as a guide for the linear light source 1. Therefore, when the linear light source 1 is pushed into the opening 41 as indicated by an arrow A shown in FIG. 1, the linear light source 1 bends the arm component 40 so that the outside diameter D2 of the arm component 40 expands as the linear light source 1 goes in between the two end faces 42 of the arm component 40. Then, the linear light source 1 goes past the bumps 53 and is inserted inside the arm component 40. The linear light source 1 collides with the protrusion 51 at this point. The top contour line of the top face 52 of the protrusion 51 has a radius of curvature that is the same as the radius of curvature of the outer peripheral face of the linear light source 1. Therefore, the linear light source 1 hits the protrusion 51 in a state of planar or linear contact, so the impact load is dispersed. As a result, even though the lamp holder 20 is made of a molded resin in the form of a hard piece that has a thickness of about 1 to 1.5 mm and is not floppy, it is unlikely that the linear light source 1 will be broken or damaged by the impact during this collision.

The elastic resiliency of the arm component 40 causes the bumps 53 to be in elastic contact with the linear light source 1 that has been inserted into the arm component 40 and stopped by the protrusion 51. Since the separation angle a from the protrusion 51 to the bumps 53 is set to an angle that is greater than 90 degrees, the linear light source 1 is pressed against the protrusion 51 as indicated by an arrow B shown in FIG. 2 by the elastic pressing action of the bumps 53. In particular, since the separation angle α between the protrusion 51 and the bumps 53 is set to 135 degrees as in this embodiment, and the top contour lines of the top faces 54 of the bumps 53 are arc shaped, the elastic pressing directions of the bumps 53 will be in directions indicated by arrows C shown in FIG. 2 toward the axial center P of the linear light source 1. Accordingly, the direction in which the linear light source 1 is pressed by the protrusion 51 under elastic pressing of the bumps 53 is mostly perpendicular to the protrusion 51, as indicated by the arrow B in FIG. 2. As a result, the linear light source 1 is supported at three places at these angles by the protrusion 51 and the bumps 53, the linear light source 1 is securely held in the lamp holder 20, and it is unlikely that the linear light source 1 will fall out of the lamp holder 20. In particular, since the directions in which the bumps 53 provided to the end portions 45 of the arm component 40 press against the linear light source 1 are set to be directions facing the axial center P of the linear light source 1, it is possible to lengthen the arm component 40 and reduce the force needed to bend the arm component 40 in the step of attaching the linear light source 1 into the lamp holder 20, while still being able to effectively prevent the linear light source 1 supported in the lamp holder 20 from falling out.

Furthermore, in this embodiment, the protrusion 51 and the bumps 53 are in contact at three places with the linear light source 1 supported by the lamp holder 20. Only the top contour line of the top face 52 of the protrusion 51 is in planar to linear contact with the linear light source 1, with the top contour lines of the top face 54 of the bumps 53 being in just point contact. Furthermore, since the recesses 57 are formed everywhere between the protrusion 51 and the bumps 53, radial gaps 70 are ensured between the linear light source 1 and the inner peripheral face 47 of the arm component 40. Thus, the arc-shaped inner peripheral face 47 of the arm component 40 does not come into planar or linear contact with the outer peripheral face of the linear light source 1. Therefore, even if either the linear light source 1 or the lamp holder 20 that supports the linear light source 1 should become distorted, it will have no effect on the linear light source 1. In particular, the linear light source 1 is supported in the lamp holder 20, the protrusion 51 comes into planar or linear contact with just one place on the outer peripheral face of the linear light source 1, and the bumps 53 come into point contact at two other places, so no space is formed at these contact sites. Accordingly, the generation of humming at the support locations is effectively prevented, and this prevents a decrease in quality of the liquid crystal module, and in turn, the audio-visual device (such as a television set) in which the liquid crystal module is used.

Figure 3:
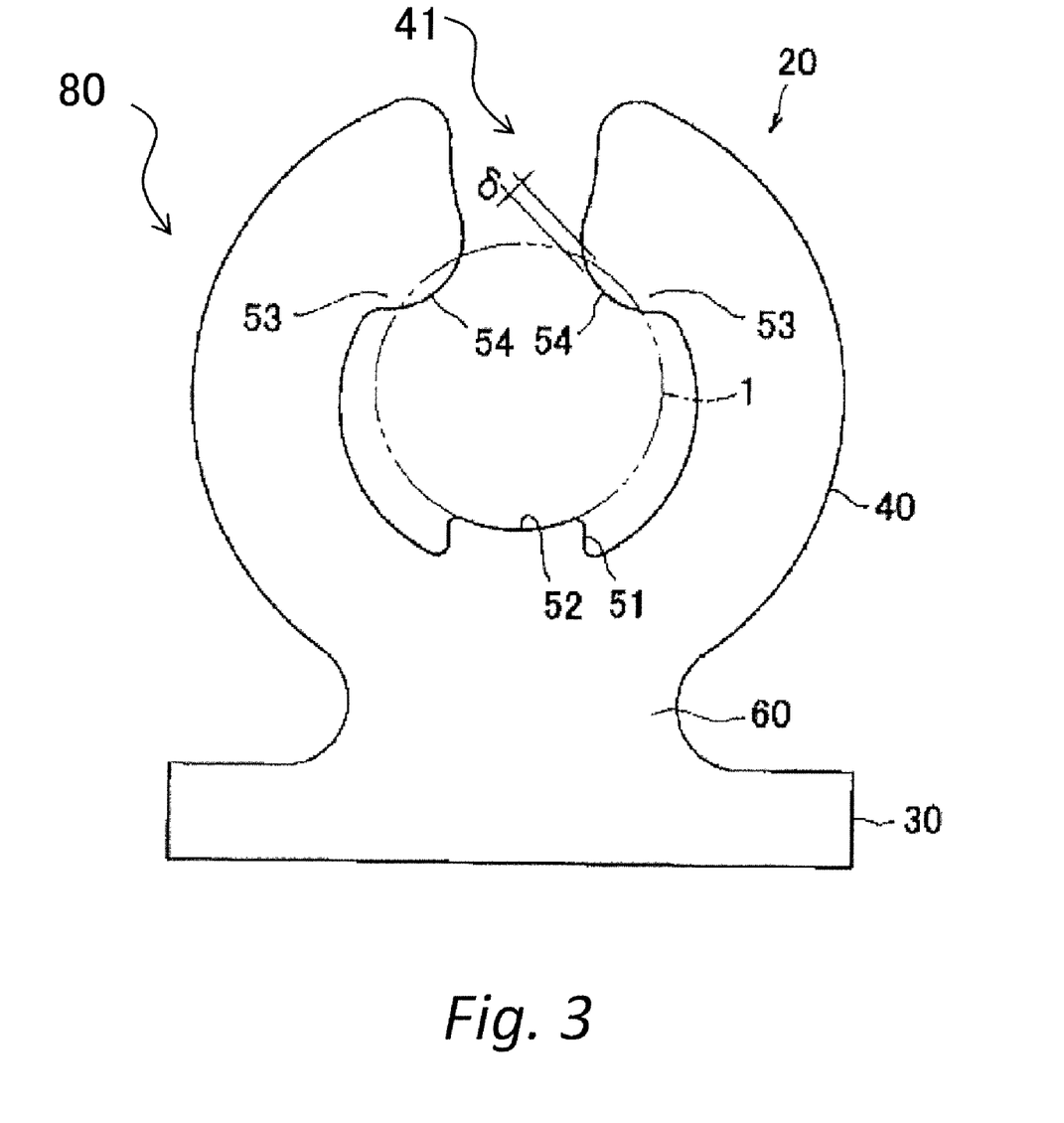
FIG. 3 is a detailed side view of the lamp holder illustrating a size of a bump of the lamp holder illustrated in FIG. 1.

In FIG. 3, the linear light source 1 with its true circular shape is shown by imaginary lines, while the shape of the arm component 40 in a no-load state (in which it does not support the linear light source 1) is shown by solid lines. As shown in FIG. 3, the bumps 53 of the arm component 40 in a no-load state maintain a natural state in which the diameter of the arm component 40 is slightly constricted compared to that of the arm component 40 in a load state (in which it is supporting the linear light source 1). In contrast, when the linear light source 1 is supported by the protrusion 51 and the bumps 53 as shown in FIG. 2, the arm component 40 is resiliently deformed so that its diameter expands. When the outside diameter D1 of the linear light source 1 is about 3 mm, it is preferable to set the displacement width δ of the bumps 53 from the natural state to the load state to about 0.1 mm, for example. If the displacement width δ is thus set to 0.1 mm, it is possible for the linear light source 1 to be securely supported in the lamp holder 20 even though only a light force is applied to the contour (circular tube) of the linear light source 1. In other words, the linear light source 1 can be easily supported in the lamp holder 20 with only moderate force, so not only is it possible to keep the impact load small, but the linear light source 1 that has been supported in the lamp holder 20 can also be effectively prevented from falling out of the lamp holder 20.

The opening width W of the opening 41 is set to about 1.6 mm and the width H of the neck component 60 to about 3.5 mm. With this configuration, only a light force will be needed to insert the linear light source 1, which helps minimize the impact load when the linear light source 1 hits the protrusion 51, and makes it possible to further suppress breakage or damage to the linear light source 1.

General Interpretation of Terms

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a backlight device for a liquid crystal module equipped with the present invention. Accordingly, these terms, as utilized to describe the present invention should be interpreted relative to a backlight device for a liquid crystal module equipped with the present invention as used in the normal operating position.

While a preferred embodiment have been chosen to illustrate the present invention, it will be apparent to those skilled in the art from these disclosures that various changes and modifications can be made herein without departing from the scope of the invention as defined in the appended claims.

Furthermore, the foregoing descriptions of the preferred embodiment according to the present invention are provided for illustration only, and not for the purpose of limiting the invention as defined by the appended claims and their equivalents.

What is claimed is:

1. A backlight device for a liquid crystal module, the backlight device comprising:
    a frame;
    a linear light source configured to emit light; and
    a lamp holder supporting the linear light source relative to the frame, the lamp holder including
        an arc-shaped arm component that has a middle portion and a pair of end portions with an opening therebetween, the end portions extending from the middle portion, respectively,
        a concave protrusion that extends from the middle portion of the arm component in a radial inward direction of the arm component, the concave protrusion having an outward concave face that contacts an outer peripheral face of the linear light source, and
        a pair of convex protrusions that extends from the end portions of the arm component in the radial inward direction of the arm component, respectively, each of the convex protrusions having an inward convex face that contacts the outer peripheral face of the linear light source at a radial innermost position of the inward convex face such that the convex protrusions press the linear light source against the concave protrusion.

2. The backlight device according to claim 1, wherein the arm component has an inner peripheral face that is circumferentially located between the concave protrusion and the convex protrusions, the inner peripheral face of the arm component being radially spaced apart from the outer peripheral face of the linear light source such that the lamp holder contacts the linear light source at only the concave protrusion and the convex protrusions of the lamp holder.

3. The backlight device according to claim 2, wherein the inner peripheral face of the arm component has a radius of curvature that is larger than a radius of curvature of the outer peripheral face of the linear light source.

4. The backlight device according to claim 1, wherein the inward convex faces of the convex protrusions has an arc shape when viewed from a central axis of the linear light source, top portions of the inward convex faces contacting the linear light source, respectively.

5. The backlight device according to claim 1, wherein the outward concave face of the concave protrusion has a radius of curvature that is equal to a radius of curvature of the outer peripheral face of the linear light source.

6. The backlight device according to claim 5, wherein the inward convex faces of the convex protrusions have a radius of curvature that is smaller than the radius of curvature of the outer peripheral face of the linear light source.

7. The backlight device according to claim 1, wherein the convex protrusions are circumferentially spaced apart from the concave protrusion by a same predetermined angle in opposite circumferential directions of the arm component, respectively.

8. The backlight device according to claim 7, wherein the convex protrusions are circumferentially spaced apart from the concave protrusion by at least 90 degrees, respectively.

9. The backlight device according to claim 7, wherein the convex protrusions are circumferentially spaced apart from the concave protrusion by 135 degrees, respectively.

10. The backlight device according to claim 1, wherein the end portions of the arm component have end faces, respectively, the end faces defining the opening therebetween, the opening having a width between the end faces that increases as the end faces extends in a radial outward direction of the arm component, the inward convex faces of the convex protrusions being smoothly connected to the end faces of the end portions of the arm component, respectively.

11. The backlight device according to claim 10, wherein the end faces of the end portions of the arm component of the lamp holder have concave surfaces, respectively.

12. The backlight device according to claim 1, wherein the lamp holder further includes
    a base component being fixedly coupled to a plate-form member that is disposed on the frame, and
    a neck component being disposed between the base component and the middle portion of the arm component, the neck component having a width that is smaller than an outer peripheral diameter of the arm component.

13. The backlight device according to claim 12, wherein the arm component of the lamp holder has a pair of arc-shaped outer faces extending from the end portions to the neck component of the lamp holder.

14. The backlight device according to claim 12, wherein the neck component of the lamp holder has a width that is larger than a diameter of the outer peripheral face of the linear light source and than a width of the opening between the end portions of the arm component of the lamp holder while the linear light source is attached to the lamp holder.

15. The backlight device according to claim 1, wherein the lamp holder is integrally formed from resin as a one-piece, unitary member.

16. The backlight device according to claim 15, wherein the lamp holder is made of polycarbonate.

17. The backlight device according to claim 1, wherein the convex protrusions press the outer peripheral face of the linear light source in directions toward an axial center of the linear light source, respectively.

18. The backlight device according to claim 1, wherein the linear light source includes a fluorescent tube.

19. The backlight device according to claim 1, wherein the concave protrusion of the lamp holder has a width that is smaller than a radius of the outer peripheral face of the linear light source when viewed from a central axis of the linear light source.

20. A lamp holder configured to support a linear light source relative to a frame, the lamp holder comprising:
    an arc-shaped arm component having a middle portion and a pair of end portions with an opening therebetween, the end portions extending from the middle portion, respectively;
    a concave protrusion extending from the middle portion of the arm component in a radial inward direction of the arm component, the concave protrusion having an outward concave face that is configured to contact an outer peripheral face of the linear light source while the linear light source is attached to the lamp holder; and a pair of convex protrusions extending from the end portions of the arm component in the radial inward direction of the arm component, respectively, each of the convex protrusions having an inward convex face that is configured to contact the outer peripheral face of the linear light source while the linear light source is attached to the lamp holder at a radial innermost position of the inward convex face such that the convex protrusions is configured to press the linear light source against the concave portion.

* * * * *